United States Patent
Van Der Meijden et al.

(10) Patent No.: US 7,108,293 B2
(45) Date of Patent: Sep. 19, 2006

(54) SWIVEL CONNECTOR FOR A PIPELINE

(75) Inventors: Hendrikus Johannes Van Der Meijden, Glen Austin (ZA); Peter Hugh Harrison, Centurion (ZA)

(73) Assignee: Zodiac Pool Care, Inc., Pompano Beach, FL (US)

( * ) Notice: Subject to any disclaimer, the term of this patent is extended or adjusted under 35 U.S.C. 154(b) by 0 days.

(21) Appl. No.: 10/450,064

(22) PCT Filed: Dec. 10, 2001

(86) PCT No.: PCT/IB01/02362

§ 371 (c)(1),
(2), (4) Date: Jan. 30, 2004

(87) PCT Pub. No.: WO02/48593

PCT Pub. Date: Jun. 20, 2002

(65) Prior Publication Data

US 2004/0119284 A1  Jun. 24, 2004

(30) Foreign Application Priority Data

Dec. 15, 2000  (ZA) ................................. 2000/7553

(51) Int. Cl.
*F16L 27/00* (2006.01)
(52) U.S. Cl. ...................... 285/275; 285/277; 285/110; 15/1.7
(58) Field of Classification Search .......... 285/275, 285/276, 279, 280, 281, 278, 277, 272, 921, 285/319, 110; 15/1.7, 144.1
See application file for complete search history.

(56) References Cited

U.S. PATENT DOCUMENTS

| 921,691 | A | * | 5/1909 | Friday | 285/276 |
| 3,588,149 | A | * | 6/1971 | Demler, Sr. | 285/110 |
| 4,673,200 | A | * | 6/1987 | Miyauchi | 285/319 |
| 4,844,512 | A | * | 7/1989 | Gahwiler | 285/39 |
| 4,991,882 | A | * | 2/1991 | Gahwiler | 285/331 |
| 5,213,376 | A | * | 5/1993 | Szabo | 285/39 |
| 5,267,757 | A | * | 12/1993 | Dal Palu | 285/148.21 |

(Continued)

FOREIGN PATENT DOCUMENTS

WO  WO 00/45080  8/2000

*Primary Examiner*—David Bochna
(74) *Attorney, Agent, or Firm*—Dean W. Russell; Kilpatrick Stockton LLP

(57) ABSTRACT

A swivel connector (10) for a pipeline includes first and second connecting members (12, 14) connectable in the pipeline. The connecting members (12, 14) have round, telescopic pipe sections (32, 42), an annular seal (36, 46) between the pipe sections, and connectors (52, 56) which swivellably, releasably connect the connecting members (12, 14). The seal includes an inwardly proud standing peripheral ridge (36) on the first pipe section (32) which is telescopically outermost, and an aligned, complemental, thin walled, dilatable band (48) on the second pipe section, which is telescopically innermost. Liquid pressure dilates the band (48) to touch the ridge (36) to effect sealing. The connectors include a peripheral shoulder (52) on a collar (50) of the member (12) and a diametrically opposed pair of hooks (56) on the member (14) and which are releasably engageable with, to be relatively swivellable to, the shoulder (52). The sealing and swivelling surfaces can be separated for cleaning and maintenance.

11 Claims, 4 Drawing Sheets

U.S. PATENT DOCUMENTS

| | | |
|---|---|---|
| 5,363,878 A | 11/1994 | Atkins |
| 5,586,791 A | 12/1996 | Kirchner et al. |
| 5,636,875 A * | 6/1997 | Wasser ...................... 285/21.1 |
| 5,775,741 A | 7/1998 | Rice et al. |
| 6,688,654 B1 * | 2/2004 | Romero ...................... 285/308 |
| 6,692,038 B1 * | 2/2004 | Braun ........................ 285/319 |

* cited by examiner

SWIVEL CONNECTOR FOR A PIPELINE

CROSS REFERENCE TO RELATED APPLICATIONS

This application claims priority to South African Provisional Application No. 2000/7553 filed on Dec. 15, 2000 and is the U.S. national phase of International Application No. PCT/IB01/102362 filed on Dec. 10, 2001 published in English as International Publication No. WO 02/48593 A2 on Jun. 20, 2002, the entire contents of which are hereby incorporated by reference.

THIS INVENTION relates to a swivel connector for a pipeline.

The Applicant expects this invention to be particularly advantageously applicable to a swivel connector for a pipeline operating under positive pressure, especially, although not necessarily exclusively, such a pipeline connecting a pool cleaner head to a pressure outlet of a pump. That application will particularly be borne in mind for purposes of this specification.

In accordance with a first aspect of this invention, there is provided a swivel connector for a pipeline, the swivel connector including first and second connecting members including respectively first and second pipe sections;

releasable connectors connected respectively to the first and second connecting members, the respective connectors having complemental, releasably engageable formations which, when they are engaged, allow relative swivelling, and retain the first and second pipe sections axially in predetermined, proximate arrangement;

first and second complemental sealing formations arranged, when the first and second pipe sections are retained in said predetermined proximate arrangement, to establish sealed communication which allow swivelling between the first and second pipe sections.

More specifically, the releasable connectors may include on one of the first and second pipe sections, a round shoulder which is co-axial with a swivel axis; and on the other of the first and second pipe sections, a plurality of symmetrically arranged clamps releasably slidably engageable with said round shoulder.

Advantageously, the first and second pipe sections may be round and may be telescopic, the first and second sealing formations being positioned annularly between the pipe sections. In a preferred embodiment, the sealing formations may include a round peripheral ridge proud of a general peripheral surface of one of the first and second pipe sections;

a round peripheral band on the other of the first and second pipe sections, the round peripheral band being positioned to be snugly, concentrically received, in axial alignment, adjacent the peripheral ridge.

In accordance with another aspect of the invention, there is provided a swivel connector for a pipeline, the swivel connector including first and second connecting members including respectively first and second round pipe sections which are telescopic;

swivelable connectors swivelably interconnecting the pipe sections in telescopic arrangement;

a round peripheral ridge proud of a general peripheral surface of one of the first and second pipe sections;

a round peripheral band on the other of the first and second pipe sections, the round peripheral band being snugly, concentrically received, in axial alignment, adjacent the ridge.

In a preferred embodiment, the peripheral ridge may stand proud of an inner periphery of an outer of the pipe sections, the peripheral band being on an outer periphery of an inner of the pipe sections. Then, advantageously, the inner of the pipe sections may be relatively thin walled in the region of the peripheral band to facilitate deformation thereof under liquid pressure in use to ensure touching between the peripheral ridge and the peripheral band.

Further, advantageously, the peripheral ridge and the peripheral band may be of different materials which are selected to have a low coefficient of friction.

The first and second connecting members may be mouldings of synthetic polymeric material, possibly, if advantageous, different synthetic polymeric materials.

In accordance with a third aspect of this invention, there is provided a swivel connector for a pipeline including first and second connecting members connectable in the pipeline, the connecting members including pipe sections having complemental sealing formations, the respective connecting members and the respective sealing formations being relatively swivelable;

first and second clamp members respectively on the first and second connecting members, the first clamp member having a hook formation and the second clamp member having a round peripheral shoulder arranged to check the hook against axial parting of, and to allow relative swivelling between, the first and second connecting members.

In a practical embodiment, the clamp member may be a composite clamp member having a plurality of hook formations respectively of limited circumferential extent. The hook formations may be regularly or symmetrically spaced. More specifically the hook formations may be two in number, and may be diametrically opposed to provide touching against the shoulder over correspondingly diametrically opposed bearing areas. The Applicants believe that the hook formations may advantageously be of small circumferential extent so as to touch the shoulder along commensurately small bearing areas.

Conveniently, the shoulder may be provided by a wall of a round peripheral groove within which the hook formations are slidably receivable. The wall may be oblique i.e. having an included angle subtended at a swivel axis at less than 180° in a direction selected to bias the hook formations radially inwardly to enhance integrity of hooking.

In a preferred embodiment, the hook formations may be fast with a skirt which is resiliently flexible and which is compressible in regions angularly spaced from the positions of the hook formations to cause the skirt to dilate in the regions of the hook formations to allow the hook formations to clear the shoulder to allow release of the clamp members.

The or each hook formation may be of a material different to a material of the shoulder, the respective materials being selected to have a low coefficient of friction.

Instead, or in addition, the swivel connector may include at least one ring, advantageously a pair of rings, interposed between the first and second clamp members. In the case of one ring it may be of a material different to that of the clamp members to enhance low friction sliding. In the case of two rings, they may be of different materials selected to have a low coefficient of friction. This has the advantage of being able to select material(s) for the ring(s) on the basis of low friction characteristics without having to bear in mind other characteristics (such as mouldability, rigidity, strength, and the like) which may be important for the connecting members or the clamp members. The ring(s) will then operate as thrust ring(s) or washer(s) which will be easily slidable.

The invention is now described by way of non-limiting example with reference to the accompanying diagrammatic drawings. In the drawings FIG. 1 shows, in three dimensional side view, a swivel connector for a pipeline in accordance with the invention;

Figure 1:
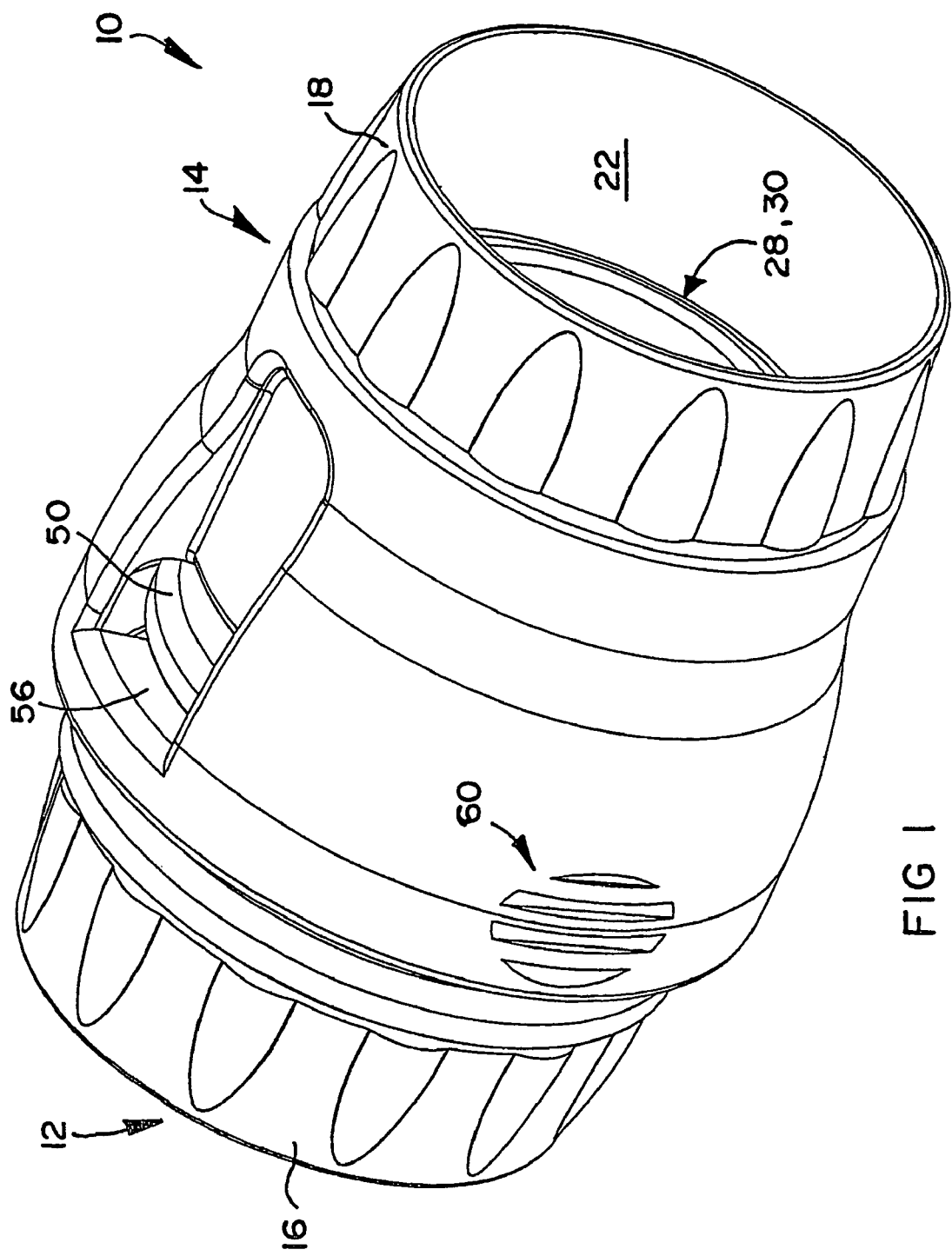
Figure 2:
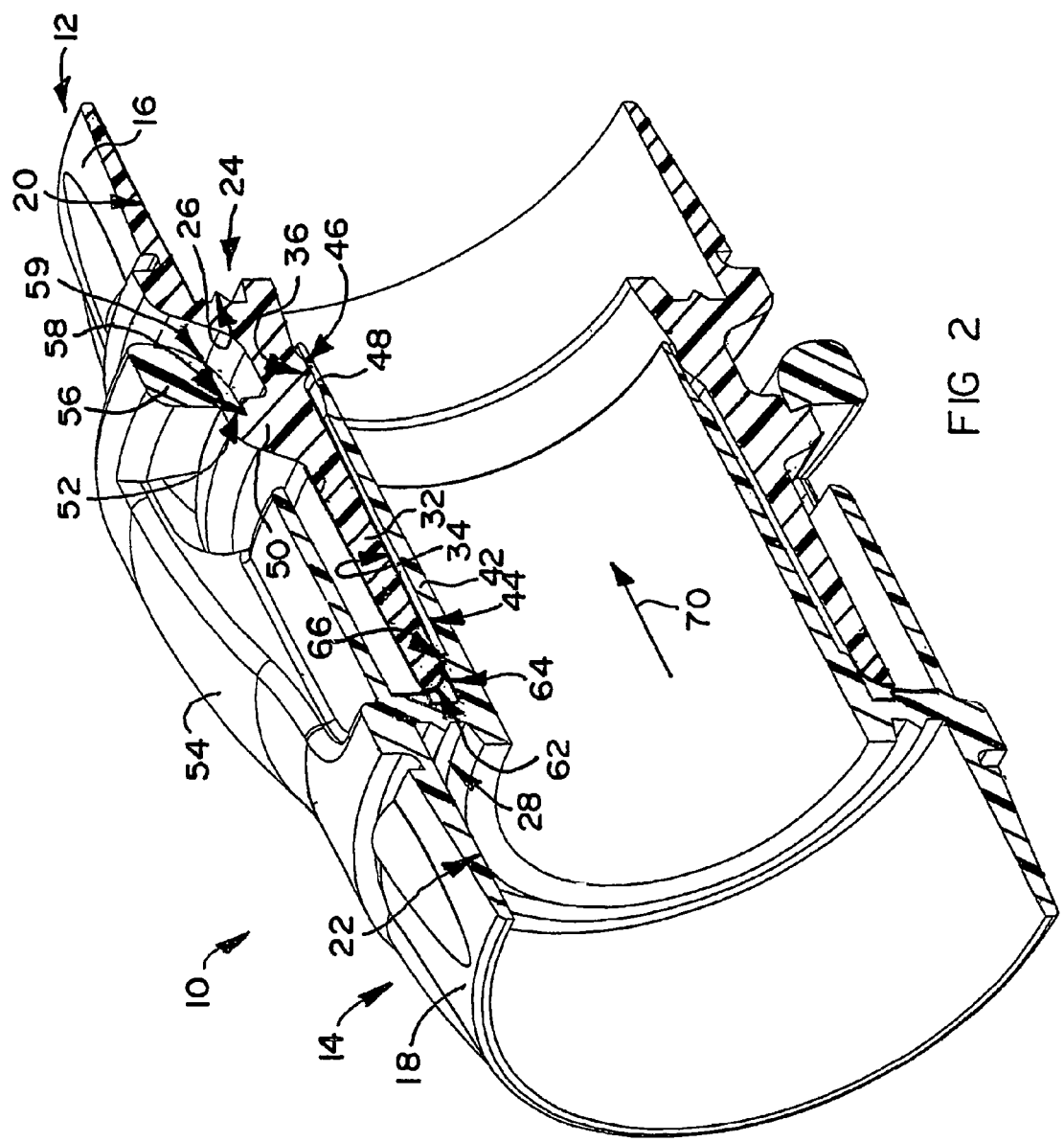
FIG. 2 shows the swivel connector of FIG. 1 in three dimensional side view, in axial section.
Figure 3:
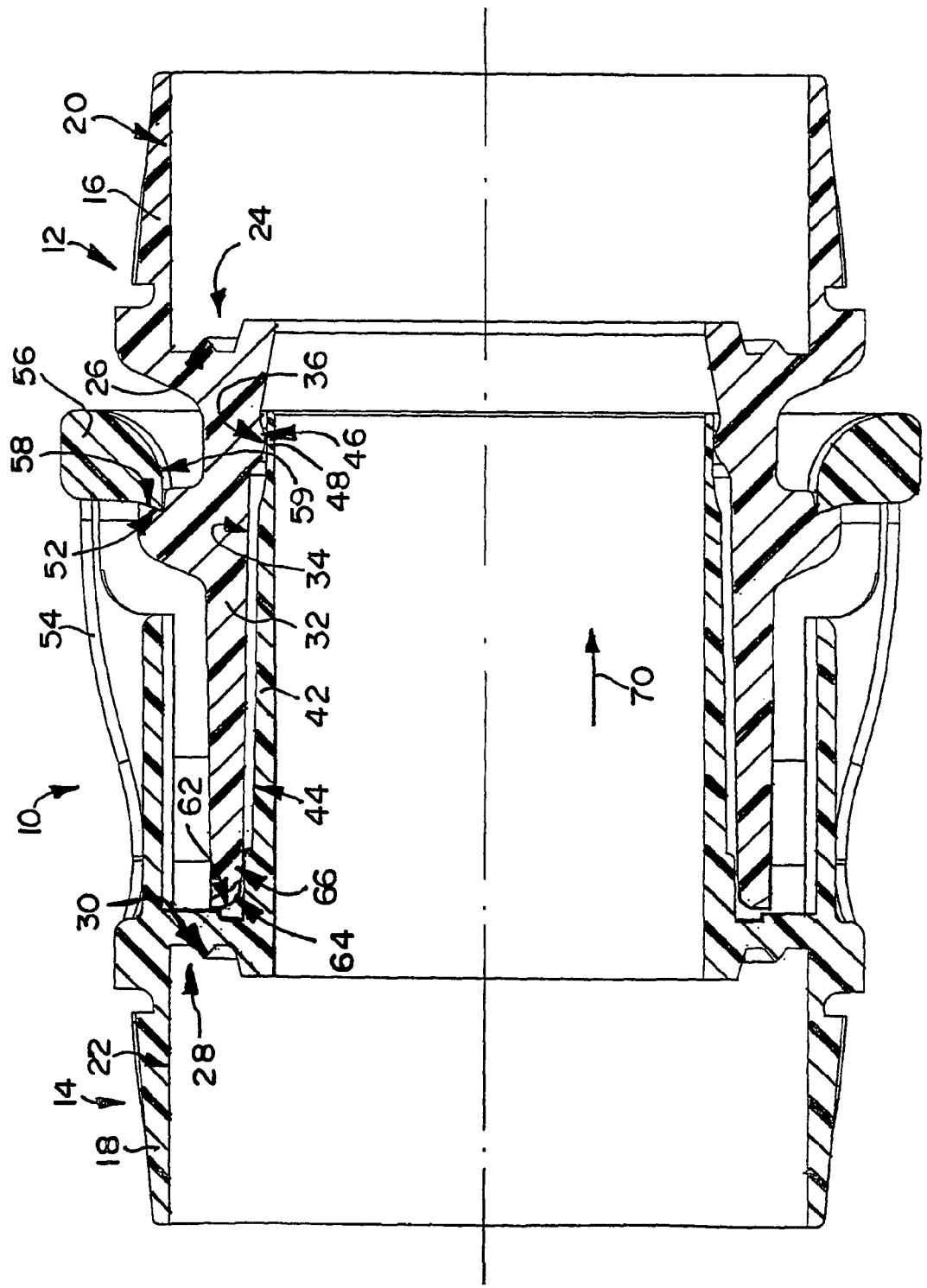
FIG. 3 shows the swivel connector of FIG. 1 in axial section.
Figure 4:
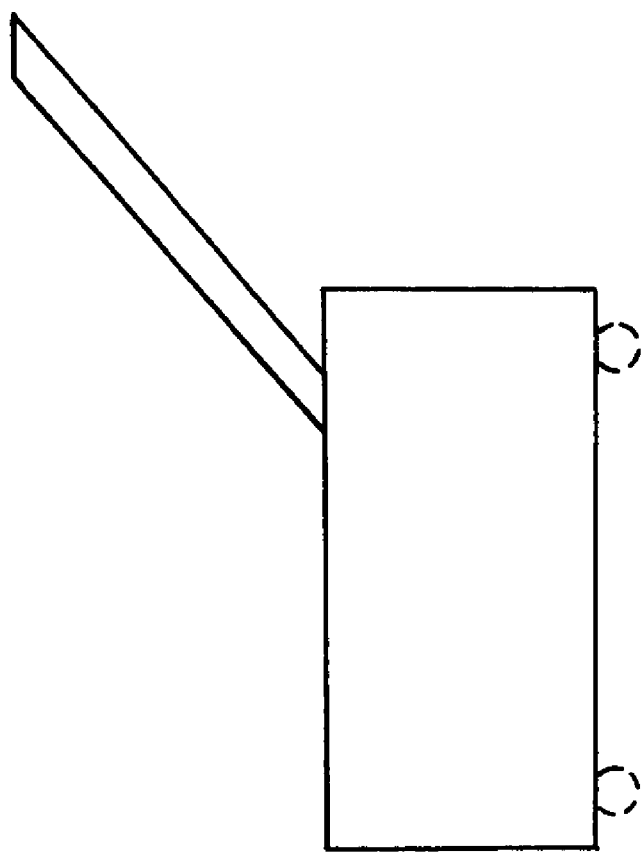
FIG. 4 is a schematic version of an exemplary pool cleaner head and connected pipeline, to which the swivel connector of FIG. 1 may be connected.

With reference to the drawings, a swivel connector for a pipeline in accordance with the invention is generally indicated by reference numeral 10. The swivel connector 10 comprises a first connecting member generally indicated by reference numeral 12 which is connectable in a pipe line, for example a pipe section. The swivel connector 10 also comprises a second connecting member generally indicated by reference numeral 14 which is connectable in the same pipe line, for example a second pipe section. The purpose of the swivel connector 10 is to render the pipeline components which are connected by the swivel connector 10, relatively swivellable.

The first and second connecting members 12, 14 respectively include socket members 16, 18 respectively defining sockets 20, 22 within which the respective components of the pipeline are sealingly received. In this embodiment, in each of the sockets 20, 22, there is provided an annular seat 24, 28, each having an axially directed peripheral ridge 26, 30 to enhance sealing. It is to be appreciated that the pipe line components will firmly, rigidly be mounted within the socket members 20, 22.

The first connecting member 12 includes a pipe section 32 integrally co-axial with, and connected at one end to, the socket member 16. The pipe section 32 has a free end terminating in a peripheral nose 62. Spaced from the nose 62, it has a peripheral ridge 36 standing radially inwardly proud of an inner periphery 34 of the pipe section. The peripheral ridge 36 is of smooth arcuate cross-sectional shape.

The second connecting member 14 includes a pipe section 42 integrally co-axial with, and connected at one end to, the socket member 18. The pipe section 42 has an outer periphery 44 which, toward a free end thereof, is reduced in diameter to provide a thin walled end portion 48 providing an outer peripheral band 46 which is snugly receivable within the peripheral ridge 36. It is emphasized that said snug receipt of the peripheral band 46 within the peripheral ridge 36 provides only light touching, or even very little clearance to ensure free swivelling between the first connecting member 12 and the second connecting member 14. Sealing takes place between the peripheral ridge 36 and the peripheral band 46 in a manner which is described in more detail below.

The swivel connector 10 includes a clamp mechanism to hold the first and second connecting members 12, 14 together against hydraulic and other parting forces, but in such a manner as to allow swivelling between the first and second connecting members.

The first connecting member 12 includes an integral peripheral collar 50 radially outwardly proud of the pipe section 32 and spaced axially inwardly from the nose 62. The collar 50 includes a peripheral groove 52 providing a smooth, round shoulder which is axially directed away from the nose 62 and which is slightly oblique to have an included angle which is obtuse, being slightly smaller than 180°.

The second connecting member 14 includes a skirt 54 of resiliently flexible material extending generally concentrically from the socket member 22 with generous clearance around the pipe section 42. At a free end of the flexible skirt 54, at diametrically opposed positions, it has ribbed bases 56, of limited circumferential extent, and each having, toward a radially inner extremity thereof, a hook formation 58 complemental to the shoulder 52. It defines a ramp formation 59, which extends axially outwardly from the hook formation 58.

When the first and second connecting members 12, 14 are to be connected and are offered to each other by inserting the male pipe section 42 of the second connecting member into the female pipe section 32 of the first connecting member 12, the ramps 59 of the bases 56 ride over an outer extremity of the collar 50. This is made possible by having the skirt 54 resiliently flexible. When the ramps 59 have ridden over the collar 50, the hook formations 58 snap into operative engagement with the shoulder 52 and are held in operative engagement by the obliqueness of the shoulder 52.

When the clamp mechanism is to be released, the flexible skirt 54 is compressed at diametrically opposed compression zones 60 provided for that purpose, one compression zone 60 being shown in FIG. 1. It is to be appreciated that the compression zones 60 are 90° angularly displaced from the angular positions of the respective ribbed bases 56. When the resiliently flexible skirt 54 is compressed at the compression zones 60, and the connecting members 12, 14 are pushed toward each other, the skirt 54 dilates at the positions of the ribbed bases 56 thus causing the hook formations 58 to release from the shoulder 52, allowing the first and second connecting members 12, 14 to be axially parted.

By way of development, the second connecting member 14, proximate a root of the pipe section 42, has an outwardly stepped portion 64 which stands proud of a general outer periphery. The pipe section 32 includes toward a free end thereof, proximate the nose 62, an inner perhiperal portion snugly, rotatably received with running clearance over the stepped portion 64. Thus, a sliding area which is small is provided to minimize friction. The sliding area is spaced from the seal 36, 46 to stabilize the pipe sections 32, 42.

The swivel connector 10 is arranged in a pipeline such that the direction of flow is as indicated by arrow 70 i.e. from the second connecting member 14 toward the first connecting member 12. The reason for this is to ameliorate the tendency for fluid to flow over the thin walled section 48 of the pipe section 42 i.e. between the peripheral band 46 and the peripheral ridge 36. Instead, it is expected that hydraulic pressure within the swivel connector will tend to dilate the thin wall section 48 to enhance sealing against the peripheral ridge 36.

The clamp mechanism operates over angular distances of small dimension to reduce the bearing areas between the hook formations 58 and the shoulder 52 and thus to reduce friction.

Furthermore, abutment of the nose 62 against the step 64 takes place over a radially thin peripheral band, also to reduce friction.

The first and second connecting members 12, 14 are in the form of synthetic polymeric mouldings. Advantageously, the materials of the respective connecting members are different so as to provide different materials touching at the interfaces respectively between the peripheral ridge 36 and the peripheral band 46; the hook formation 58 and the shoulder 52; and the stepped portion 64 and inner perhipery 66.

The Applicants regard it as a very important advantage that the relatively swivelable components of the swivel connector can be disengaged and separated, e.g. for cleaning or maintanance purposes. It is expected that this feature will enhance the integrity of swiveling and will prolong the useful life of the swivel connector.

The Applicants regard it as an important advantage that a swivel connector for a pipeline is provided in the form of synthetic polymeric mouldings without having separate subcomponents in any one of the connecting members and without having components which are relatively movable (other than relative movement obtained through resiliently flexible deformation). Thus, the swivel connector, when mass produced, can be produced cost effectively.

The Applicants regard it as a further advantage that the swivel connector is user friendly in that it can very easily be engaged and disengaged.

It is yet further regarded as an advantage that the swivel connector is expected to be durable and of materials which can be selected to withstand arduous operation conditions.

It is yet a further advantage that the swivel connector is versatile. For example, it can be used between pipe sections, between a fixed pipeline component and a pipe section, and the like.

The invention claimed is:

1. A pool cleaning assembly comprising:
   a pool cleaner having a head;
   a pipeline connected to the head; and
   a swivel connector connected to the pipeline, the swivel connector including:
   first and second connecting members including respectively first and second pipe sections;
   releasable connectors connected respectively to the first and second connecting members, the respective connectors having complemental, releasably engageable formations which, when they are engaged, allow relative swivelling, and retain the first and second pipe sections axially in predetermined, proximate arrangement against hydraulic and other parting forces, and which, when they are released, allow the first and second connecting members to be separated; and
   first and second complemental sealing formations arranged, when the first and second pipe sections are retained in said predetermined proximate arrangement, to establish sealed communication which allow swivelling between the first and second pipe sections, with the first complemental sealing formation being integrally formed with the first pipe member and the second complemental sealing formation being integrally formed with the second pipe member.

2. A pool cleaning assembly as claimed in claim 1 in which the first and second connecting members are respectively mouldings of different synthetic polymeric materials.

3. A pool cleaning assembly as claimed in claim 1 in which the first and second complemental sealing formations are configured so that hydraulic pressure within the connector enhances their sealing.

4. A swivel connector for a pipeline, the swivel connector including
   first and second connecting members including respectively first and second pipe sections;
   releasable connectors connected respectively to the first and second connecting members, the respective connectors having complemental, releasably engageable formations which, when they are engaged, allow relative swivelling, and retain the first and second pipe sections axially in predetermined, proximate arrangement against hydraulic and other parting forces, and which, when they are released, allow the first and second connecting members to be separated;
   first and second complemental sealing formations arranged, when the first and second pipe sections are retained in said predetermined proximate arrangement, to establish sealed communication which allow swivelling between the first and second pipe sections, with the first complemental sealing formation being integrally formed with the first pipe member and the second complemental sealing formation being integrally formed with the second pipe member; and in which the releasable connectors include on one of the first and second pipe sections, a round shoulder which is co-axial with a swivel axis and which is oblique having an included angle which is obtuse; and on the other of the first and second pipe sections, a plurality of symmetrically arranged clamps releasably slidably engageable with said round shoulder, the clamps, when engaged, being biassed radially inwardly by obliqueness of the shoulder.

5. A swivel connector as claimed in claim 4 in which each clamp has a hook formation and in which the hook formations are fast with a skirt which is resiliently flexible and which is compressible in regions angularly spaced from the positions of the hook formations to cause the skirt to dilate in the regions of the hook formations to allow the hook formations to clear the shoulder to allow release of the hook formations.

6. A swivel connector for a pipeline, the swivel connector including
   first and second connecting members including respectively first and second pipe sections;
   releasable connectors connected respectively to the first and second connecting members, the respective connectors having complemental, releasably engageable formations which, when they are engaged, allow relative swivelling, and retain the first and second pipe sections axially in predetermined, proximate arrangement against hydraulic and other parting forces, and which, when they are released, allow the first and second connecting members to be separated;
   first and second complemental sealing formations arranged, when the first and second pipe sections are retained in said predetermined proximate arrangement, to establish sealed communication which allow swivelling between the first and second pipe sections, with the first complemental sealing formation being integrally formed with the first pipe member and the second complemental sealing formation being integrally formed with the second pipe member; and in which the first and second pipe sections are round and are telescopic, the first and second sealing formations being positioned annularly between the pipe sections, the sealing formations including
   a round peripheral ridge proud of a general peripheral surface of one of the first and second pipe sections;
   a round peripheral band on the other of the first and second pipe sections, the round peripheral band being positioned to be snugly, concentrically received, in axial alignment, adjacent the peripheral ridge.

7. A swivel connector as claimed in claim 6 in which the inner of the pipe sections is thin walled in the region of the peripheral band to facilitate deformation thereof under liquid pressure in use to ensure touching between the peripheral ridge and the peripheral band.

8. A swivel connector as claimed in claim 6 in which the peripheral ridge and the peripheral band are of different materials which are selected to have a low coefficient of friction.

9. A pool cleaning assembly comprising:
a pool cleaner having a head;
a pipeline connected to the head; and
a swivel connector connected to the pipeline, the swivel connector including:
first and second connecting members including respectively first and second pipe sections;
releasable connectors connected respectively to the first and second connecting members, the respective connectors having complemental, releasably engageable formations which, when they are engaged, allow relative swivelling, and retain the first and second pipe sections axially in predetermined, proximate arrangement; and
first and second complemental sealing formations arranged, when the first and second pipe sections are retained in said predetermined proximate arrangement, to establish sealed communication which allow swivelling between the first and second pipe sections, with the first complemental sealing formation being integrally formed with the first pipe member and the second complemental sealing formation being integrally formed with the second pipe member.

10. A pool cleaning assembly as claimed in claim 9 in which the first and second complemental sealing formations are configured so that hydraulic pressure within the connector enhances their sealing.

11. A swivel connector for a pipeline, the swivel connector including first and second connecting members including respectively
first and second round pipe sections which are telescopic, one of the pipe sections being an inner section and having an outer periphery and the other of the pipe sections being an outer section and having an inner periphery;
swivelable connectors swivelably interconnecting the pipe sections in telescopic arrangement;
a round peripheral ridge proud of the inner periphery of the outer section;
a round peripheral band on the outer periphery of the inner section, the round peripheral band being snugly, concentrically received, in axial alignment, adjacent the ridge;
the inner section having a wall with a maximum thickness, the wall having a thickness of less than the maximum thickness in the region of the peripheral band.

* * * * *